United States Patent [19]

Muramoto et al.

[11] Patent Number: 5,017,646

[45] Date of Patent: May 21, 1991

[54] AQUEOUS VINYL RESIN EMULSION

[76] Inventors: Hisaichi Muramoto, 25-3-110, Takadono 3-chome, Asahi-ku, Osaka-shi; Keizuo Ishii, 1-19, Shimizu-cho, Ashiya-shi, Hyogo-ken; Tadafumi Miyazono, 2-10, Yanagawa-cho 1-chome, Takatsuki-shi, Osaka-fu, all of Japan

[21] Appl. No.: 1,009

[22] Filed: Jan. 7, 1987

[30] Foreign Application Priority Data

Jan. 8, 1986 [JP] Japan .................................. 61-001900
Jun. 25, 1986 [JP] Japan .................................. 61-148985

[51] Int. Cl.$^5$ .............................................. C08L 43/00
[52] U.S. Cl. ..................................... 524/807; 524/808; 524/809; 524/812; 524/813; 524/814; 524/815; 524/816; 524/819; 524/820; 524/821; 524/822; 524/823; 524/824; 524/832; 524/833
[58] Field of Search ............... 524/808, 807, 809, 812, 524/813, 814, 815, 816, 819, 820, 821, 822, 823, 824, 832, 833

[56] References Cited

PUBLICATIONS

Homola, A. and James, R. O., "Preparation and Characterization of Amphoteric Polystyrene Latices," *Journal of Colloid and Interface Science*, vol. 59, No. 1, 123–134 (1977).
Ishikura et al, U.S. Pat. No. 4,468,493, issued Aug. 28, 1984, "High Solid Coating Composition Containing Novel Microparticles of Crosslinked Copolymer Containing Amphoionic Groups."

*Primary Examiner*—Joseph L. Schofer
*Assistant Examiner*—J. M. Reddick

*Attorney, Agent, or Firm*—Woodcock Washburn Kurtz Mackiewicz & Norris

[57] ABSTRACT (A) 1 to 50% by weight of at least one end carboxyl bearing reactive vinyl monomer of the formula:

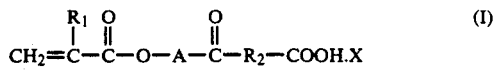

in which $R_1$ is hydrogen or methyl group; $R_2$ is a substituted or unsubstituted aliphatic hydrocarbon having 2 to 10 carbon atoms, alicyclic hydrocarbon having 6 to 7 carbon atoms or aromatic hydrocarbon having 6 carbon atoms; A is a repeating unit of

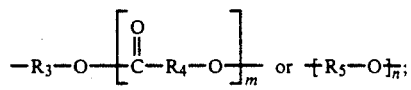

$R_3$ is ethylene or propylene; $R_4$ is a substituted or unsubstituted alkylene having 2 to 7 carbon atoms; $R_5$ is a substituted or unsubstituted alkylene having 2 to 5 carbon atoms; m is an integer of 1 to 10; n is an integer of 2 to 50; X is an inorganic or organic base, and when α, β-ethylenically unsaturated compound(s) (B) hereinunder referred to includes a basic relative monomer, it may be hydrogen atom, and (B) 99 to 50% by weight of at least one other α, β-ethylenically unsaturated compounds, in an aqueous medium through an emulsion polymerization and removing the said medium therefrom.

The invention also concerns an aqueous emulsion containing said microparticles in a considerable quantity, which is specifically useful in an aqueous paint.

7 Claims, No Drawings

AQUEOUS VINYL RESIN EMULSION

FIELD OF THE INVENTION

The invention relates to novel vinyl resin microparticles and an aqueous emulsion containing the same, which is useful in an aqueous paint capable of resulting a coating with improved water resistance.

In a specific embodiment, the invention provides a vinyl resin emulsion containing ultra-fine vinyl resin particles in a stabilized state of dispersion in a considerably higher concentration in an aqueous medium.

BACKGROUND OF THE INVENTION

An aqueous vinyl resin emulsion prepared by an emulsion polymerization of $\alpha,\beta$-ethylenically unsaturated compounds as vinyl acetate, vinyl chloride, vinylidene chloride, acrylic monomer and the like, in an aqueous medium in the presence of an emulsifier and a polymerization initiator has been widely used in various, aqueous paints.

In this type of emulsion, fine vinyl resin particles are stably dispersed in an aqueous medium.

However, since a considerable quantity of surfactant or emulsifier are generally required for both purposes of securing a uniform dispersion of monomers in a reaction medium and a stable dispersion of thus formed microparticles in a dispersing medium, they are always remained in the emulsion causing undesirable decrease in water resistance of the formed coating.

To cope with the same, the so-called soap-free polymerization using no surfactant or emulsifier had been proposed by A. Homola, R. O. James, J. Colloid. Interface Sci. 59, 123 to 134 (1977), wherein a monomer having in its molecule an amino group and a monomer having a carboxyl group as acrylic acid, methacrylic acid or the like are copolymerized without using a surfactant or emulsifier to obtain an anphoionic resin latex. However, in this soap-free polymerization, since there is no surfactant in the reaction system, dispersion stability of thus formed latex particles is rather poor and therefore, it is unable to increase the latex solid content to a desired higher level. Furthermore, a mean diameter of thus formed resin particles is at most several hundreds nm and it is hardly possible to obtain the particles of much smaller size from the technical standview. Incidentally, the latex product obtained by A. Homola et al had a solid content of less than 10% and a mean grain size of more than $0.1\mu$.

It is, therefore, an object of the invention to provide a stable vinyl resin emulsion containing no external surfactant of emulsifier, which is useful in an aqueous paint. A further object of the invention is to provide a stable vinyl resin emulsion containing ultra-fine resin particles in a higher solid concentration. An additional object of the invention is to provide novel vinyl resin microparticles which are very useful in paint and other areas.

SUMMARY OF THE INVENTION

The aforesaid and other objects of the present invention can be advantageously attained with an emulsion obtained by an emulsion polymerization of (A) 1 to 50% by weight of at least one end carboxyl bearing reactive vinyl monomer of the formula:

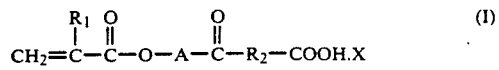

in which $R_1$ is hydrogen or methyl group; $R_2$ is a substituted or unsubstituted aliphatic hydrocarbon having 2 to 10 carbon atoms, alicyclic hydrocarbon having 6 to 7 carbon atoms or aromatic hydrocarbon having 6 carbon atoms; A is a repeating unit of

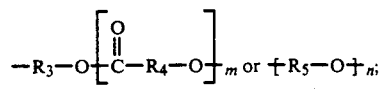

$R_3$ is ethylene or propylene; $R_4$ is a substituted or unsubstituted alkylene having 2 to 7 carbon atoms; $R_5$ is a substituted or unsubstituted alkylene having 2 to 5 carbon atoms; m is an integer of 1 to 10; n is an integer of 2 to 50; X is an inorganic or organic base, and when $\alpha,\beta$-ethylenically unsaturated compound(s) (B) hereinunder referred to includes a basic reactive monomer, it may be hydrogen atom, and (B) 99 to 50% by weight of at least one other $\alpha,\beta$-ethylenically unsaturated compounds, in an aqueous medium.

The vinyl resin microparticles of this invention may be successfully and advantageously obtained by removing the aqueous medium from thus formed emulsion.

According to a particularly preferred embodiment of the invention, a vinyl resin emulsion which is very useful in a paint industry is provided by selecting a basic monomer having in its molecule an amino group, a hetero-nitrogen atom or their onium structured groups in an amount of 1 to 25% by weight of said other $\alpha,\beta$-ethylenically unsaturated compounds (B).

The end carboxyl bearing, reactive vinyl monomers (A) represented by the aforesaid formula (I) and used in the preparation of the present vinyl resin emulsion are novel compounds obtained by the polymerization of an end hydroxyl bearing acrylate or methacrylate of the formula:

wherein $R_1$ is hydrogen or methyl group; A is a repeating unit of

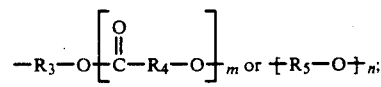

$R_3$ is ethylene or propylene; $R_4$ is a substituted or unsubstituted alkylene having 2 to 7 carbon atoms; $R_5$ is a substituted or unsubstituted alkylene having 2 to 5 carbon atoms; m is an integer of 1 to 10 and n is an integer of 2 to 50, and an acid anhydride of the formula (III):

wherein R₂ represents a substituted or unsubstituted aliphatic hydrocarbon having 2 to 10 carbon atoms, alicyclic hydrocarbon having 6 to 7 carbon atoms or aromatic hydrocarbon having 6 carbon atoms, preferably in the presence of a radical polymerization inhibitor. The corresponding salts may be easily obtained by neutralizing thus formed free acid with an inorganic or organic base material.

Examples of end hydroxyl bearing (meth) acrylates are addition products of hydroxyethyl acrylate, hydroxyethyl methacrylate, hydroxypropyl acrylate, or hydroxypropyl methacrylate with a cyclic ester as β-propiolactone, δ-valerolactone, δ-caprolactone, ε-caprolactone or the like, and addition products of acrylic acid or methacrylic acid with a cyclic ether as ethylene oxide, propylene oxide, tetrahydrofuran or the like.

Various such products are commercially available as, for example, Placcel FA-1 (1:1 addition product of hydroxyethyl acrylate and ε-caprolactone), Placcel FM-1 (1:1 addition product of hydroxyethyl methacrylate and ε-caprolactone), Placcel FA-3 (1:3 addition product of hydroxyethyl acrylate and ε-caprolactone), Placcel FM-3 (1:3 addition product of hydroxyethyl methacrylate and ε-caprolactone), Placcel FA-5 (1:5 addition product of hydroxyethyl acrylate and ε-caprolactone), Placcel FM-5 (1:5 addition product of hydroxyethyl methacrylate and ε-caprolactone) (trademarks of Daicel Chem. Co.) ; Blenmer PE (addition product of methacrylic acid and ethylene oxide), Blenmer PP (addition product of methacrylic acid and propylene oxide) (trademarks of Nippon Yushi), and the like. Other similar products may easily be prepared as desired.

As the acid anhydrides of the aforesaid formula (III), mention is made of succinic anhydride, maleic anhydride, phthalic anhydride, tetrahydro phthalic anhydride, hexahydro phthalic anhydride, trimellitic anhydride, het acid anhydride, hymic anhydride, adipic anhydride, azelaic anhydride, sebacic anhydride and substituted derivatives thereof.

Though the reaction of said end hydroxyl bearing acrylate or methacrylate (II) and acid anhydride (III) may be easily carried out under heating and stirring conditions, it is preferred to be progressed in the presence of radical polymerization inhibitor as, for example, hydroquinone monomethyl ether for the protection of the end vinyl group. Usually, such radical polymerization inhibitor is used in a concentration of 5000 ppm or less, and more preferably 500 ppm or less.

The weight ratio of said hydroxyl bearing (meth)acrylate to acid anhydride is generally set in a range of 9:10 to 11:10. In the present end carboxyl bearing reactive vinyl monomer (A), there include both hydrophilic portion represented by the end carboxyl group and hydrophobic portion represented by the alkylene chains of R₂ and A and the ratio of these portions may be freely controlled as desired. For this reason, an excellent surface activation power is given to the said reactive monomer (A). The inventors have also found that a far great surface activation power can be expected with the said end carboxyl bearing reactive vinyl monomer (A) in the salt form neutralized with an inorganic or organic base material.

Thus, in the present invention, as the most characteristic feature thereof, the following compound (I)

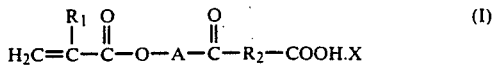

(wherein R₁, A, R₂ and X are as defined above) is used in the sense of reactive monomer, as well as an internal emulsifier having a function of surface activator. According to the invention, 1 to 50% by weight of said reactive vinyl monomer (A) and 99 to 50% by weight of at least one other α,β-ethylenically unsaturated compound(s) (B) are copolymerized in an aqueous medium by a conventional emulsion polymerization means, but using no additional external emulsifier or surfactant. As the α,β-ethylenically unsaturated compounds (B) copolymerized with said reactive vinyl monomer (A), any of the members customarily used in the preparation of vinyl resins may be successfully used. They are, in general, classified as follows.

1) carboxyl containing monomer
as, for example, acrylic acid, methacrylic acid, crotonic acid, itaconic acid, maleic acid, fumaric acid and the like, 2) hydroxyl containing monomer
as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like, 3) nitrogen containing alkyl acrylate or methacrylate
as, for example, dimethylaminoethyl acrylate, dimethylaminoethyl methacrylate and the like, 4) polymerizable amide
as, for example, acrylamide, methacrylamide and the like, 5) polymerizable nitrile
as, for example, acrylonitrile, methacrylonitrile and the like, 6) alkyl acrylate or methacrylate
as, for example, methyl acrylate, methyl methacrylate, ethyl acrylate, ethyl methacrylate, n-butyl acrylate, n-butyl methacrylate, 2-ethyl hexyl acrylate and the like, 7) polymerizable aromatic compound
as, for example, styrene, α-methyl styrene, vinyl toluene, t-butyl styrene and the like, 8) α-olefin
as, for example, ethylene, propylene and the like, 9) vinyl compound
as, for example, vinyl acetate, vinyl propionate and the like, 10) diene compound
as, for example, butadiene, isoprene and the like, 11) polymerizable unsaturated monocarboxylic acid ester of polyhydric alcohol; polymerizable unsaturated alcohol ester of polycarboxylic acid, 12) aromatic compound having 2 or more vinyl groups
as, for example, ethyleneglycol acrylate, ethyleneglycol methacyrlate, triethyleneglycol dimethacrylate, tetraethyleneglycol dimethacrylate, 1,3-butyleneglycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacryalte, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxymethylethane diacrylate, 1,1,1-trishydroxymethylethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimellitate, diallyl terephthalate, diallyl phthalate, divinyl benzene and the like.

These monomers may be used each in singularly or in combination form of two or more. The emulsion polymerization is carried out in a conventional way.

Since the monomer (A) of the abovesaid formula (I) do have a surface activation ability, there is no need of using an external emulsifier or surfactant.

However, when the monomer content of said (A) is low, it is sometimes preferred to use a smaller quantity of conventional surfactant or emulsifier. In that case, particularly preferred external surfactants or emulsifiers are amphoionic resins stated in Japanese Patent Applications 110865/79, 56048/80, 116293/80, 123899/78, 47652/80, 71864/81, 13053/82 (Kokai Nos. 34725/81; 151721; 40504/82; 51050/80; 145250/81; 187302/82; 129066/83) and the like. These publications are therefore referred to in the specification.

As a polymerization initiator, any of the members customarily used in the polymerization of vinyl monomers may be successfully and advantageously used.

Examples of such members are organic peroxides as benzoyl peroxide, t-butyl peroxide, cumenhydro peroxide and the like; organo azo compounds as azobiscyanovaleric acid, azobisisobutyronitrile, azobis (2,4-dimethyl) valeronitrile, azobis (2-amidinopropane) hydrochloride and the like; inorganic water-soluble radical initiators as potassium persulfate, ammonium persulfate, sodium persulfate, hydrogen peroxide and the like; redox initiators and the like. It is also possible to use, as a chain transfer agent, mercaptans as ethyl mercaptan, butyl mercaptan, dodecyl mercaptan and the like; halogenated carbons as carbon tetrabromide, carbon tetrachloride and the like. The amounts of such external surfactant or emulsifier, if adopted, polymerization initiator, chain transfer agent and aqueous medium are of convention and the polymerization technique is also of the common.

Thus obtained emulsion does not include any external emulsifier or surfactant, or even if such material is used, does include only a limited amount of such emulsifier or surfactant, and therefore, can provide a coating with excellent properties especially in respect of water resistance thereof. Therefore, the present emulsion is very useful in an aqueous paint.

When the aqueous medium is removed from said emulsion by, for example, spray drying, flash evaporation, air drying, solvent replacement or the like, fine particles of novel vinyl resin of the invention can be easily obtained. Such resin particles are free from the external emulsifier or surfactant and are useful as resinous filler or the like in paint, plastic and other various industries.

In this invention, diameter of said vinyl resin particles may be freely controlled in a range of about 10 to 500 nm by the selection of particular type or amount of said reactive monomer (A) and the type or amount of other polymerizable compound (B), which is also an additional advantage of this invention.

As already stated, the reactive vinyl monomer (A) is used in the form of soluble salt neutralized with an inorganic or organic base material. However, when the α,β-ethylenically unsaturated compounds (B) to be copolymerized with said (A) include a basic monomer, said neutralization may be advantageously carried out with the said basic monomer itself. Therefore, in that case, the reactive vinyl monomer (A) may be used in the form of free acid (X=H).

As the basic monomer, any of the reactive vinyl monomer having in its molecule an amino group, a heteronitrogen atom or their onium structured groups may be successfully used. Examples of such monomers are as follows.

1) amino bearing reactive vinyl monomers represented by the formula:

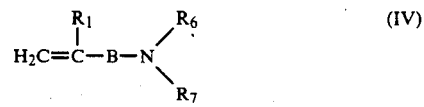

in which $R_1$ is hydrogen or methyl group; $R_6$ and $R_7$ each represents hydrogen, substituted or unsubstituted alkyl having 1 to 4 carbon atoms; B is

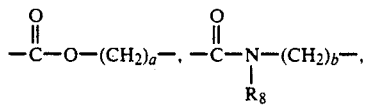

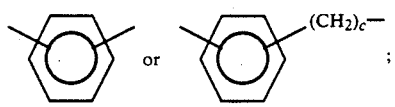

$R_8$ represents hydrogen or lower alkyl having 1 to 4 carbon atom; a,b and c each represents an integer of 2 to 6. Specific examples are dimethylaminoethyl acrylate, dimethylaminoethyl methacrylate, dimethylaminoethyl acrylate, diethylaminoethyl methacrylate, N-methyl-N-dimethylaminoethyl acrylamide, N-methyl-N-dimethylaminoethyl methacyrlamide, dimethylaminostyrene, diethylaminoethyl styrene, dimethylaminovinyl pyridine and the like.

2) ammonium bearing reactive vinyl monomers represented by the formula:

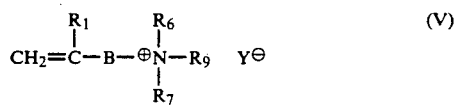

in which $R_1$, $R_6$, $R_7$ and B are as defined above; $R_9$ is substituted or unsubstituted alkyl having 1 to 12 carbon atoms; and Y is an acid residue.

Specific examples are trimethyl ammonium ethyl acrylate, trimethl ammonium ethyl methacrylate, triethyl ammonium propyl acrylamide, triethyl ammonium propyl methacrylamide, trimethyl ammonium p-phenylene acrylamide, trimethyl ammonium p-phenylene methacyrlamide and the like, 3) reactive vinyl monomers having a quaternary ammonium structure, represented by the formula:

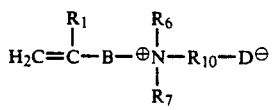  (VI)

in which $R_1$, $R_6$, $R_7$ and B are as defined above; $R_{10}$ is substituted or unsubstituted alkylene having 2 to 6 carbon atoms; and D represents —$SO_3$, —COO or

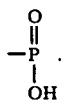

Specific examples are N-(3-sulfopropyl)-N-methacryloxyethyl-N,N-dimethyl ammonium betaine, N-(3-sulfopropyl)-N-methacrylamidepropyl-N,N-dimethyl ammonium betaine, N-(3-phosphopropyl)-N-methacryloxyethyl-N,N-dimethyl ammonium betaine, N-(2-carboxyethyl)-N-methacrylamidopropyl-N,N-dimethyl ammonium betaine and the like, 4) reactive vinyl monomers having a hetero-nitrogen atom or its onium structure, represented by the formula:

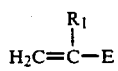  (VII)

in which $R_1$ is hydrogen or methyl group; E is

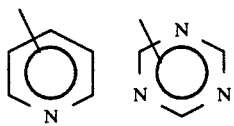

and

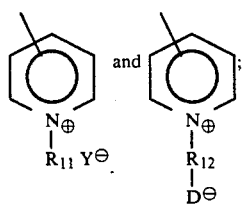

$R_{11}$ is an alkyl group; Y is an acid residue; $R_{12}$ is a substituted or unsubstituted alkylene having 2 to 6 carbon atoms; D is —$SO_3$, —COO or

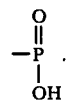

Specific examples are vinyl pyridine, vinyl triazine, 2-vinyl-1-methyl pyridinium chloride, 1-(2-carboxyethyl)-2-vinyl pyridinium betaine, 1-(3-sulfopropyl)-2-vinyl pyridinium betaine and the like.

Thus, in the present invention, various combination of α,β-ethylenically unsaturated compounds (B) may be reacted with the end carboxyl bearing vinyl monomer (A) to obtain the novel vinyl resin microparticles or emulsion containing the same.

However, the present inventors have also found that in the most preferable embodiment of this invention, 1 to 25% by weight of the end carboxyl bearing reactive vinyl monomer (A) of the formula (I) (X=H), 1 to 25% by weight of the aforesaid basic monomer, and 98 to 50% by weight of α,β-ethylenically unsaturated compound(s) other than the abovesaid two are copolymerized in an aqueous medium by using an emulsion polymerization technique to obtain an emulsion containing ultra-fine particles (average size of 0.01 to 0.1μ) of amphoionic vinyl resin in a higher solid concentration (20 to 40% by weight solid content) in a stabilized state of dispersion, and thus obtained emulsion is specifically useful in an aqueous coating composition, since the application characteristic of the coating composition is excellent and the resulted coating has extremely improved properties especially in respect of water resistance and mechanical strength.

The invention shall be now more fully explained in the following Examples. Unless otherwise being stated, all parts and percentages are by weight.

REFERENCE EXAMPLE 1

Preparation of end carboxyl bearing reactive monomer (1)

Into a 1 liter glass flask fitted with a stirrer, a Dimroth condenser, a thermometer and an air inlet tube, were placed 150 parts of succinic anhydride, 385 parts of Placcel FM-1 (1:1 mol adduct of ε-caprolactone and 2-hydroxyethyl methacrylate, trademark of Daicel Chem. Co.) and 500 ppm of hydroquinone monomethyl ether. While introducing air, the mixture was stirred at 150° C. (inner temperature) for 40 minutes. After completion of reaction, the mixture was allowed to cool to a room temperature and the formed crystals of unreacted acid anhydride were filtered off to obtain the desired end carboxyl bearing monomer product (1), whose acid value was 172 and viscosity (25° C.) was 250 cp. The reaction percentage calculated from the measured acid value was 96%.

REFERENCE EXAMPLE 2

Preparation of end carboxyl bearing reactive monomer (2)

Into a similar reaction vessel as used in Reference Example 1, were placed 60 parts of succinic anhydride, 440 parts of Placcel FM-5 (5:1 mol addition product of ε-caprolactone and 2-hydroxyethyl methacrylate, trademark of Daicel Chem. Co.) and 500 ppm of hydroquinone monomethyl ether. While introducing air, the mixture was stirred at 150° C. (inner temperature) for 60 minutes to proceed the reaction. Thereafter, the reaction mixture was allowed to cool to precipitate crystals of unreacted acid anhydride, and filtered to obtain the desired end carboxyl bearing reactive monomer product (2), whose acid value was 70 and which was a semisolid product at 25° C. The reaction percentage was measured as in Reference Example 1 and was found to be 96%.

REFERENCE EXAMPLE 3

Preparation of end carboxyl bearing reactive monomer (3)

Into a similar reaction vessel as sued in Reference Example 1, were placed 98 parts of maleic anhydride, 480 parts of Placcel FM-3 (3:1 mol addition product of ε-caprolactone and 2-hydroxyethyl methacrylate, trademark of Daicel Chem. Co.) and 500 ppm of hydroquinone monomethyl ehter. While introducing air, the mixture was stirred at 150° C. (inner temperature) for 60 minutes to proceed the reaction. Thus obtained product had an acid value of 103 and a viscosity of 350 cp (25° C.). The reaction percentage measured in the same way as stated in Reference Example 1 was 95%.

REFERENCE EXAMPLE 4

Preparation of end carboxyl bearing reactive monomer (4)

Into a similar reaction vessel as sued in Reference Example 1, were placed 154 parts of tetrahydrophthalic anhydride, 420 parts of Blenmer PE-350 (7-9:1 mol addition product of ethylene oxide and methacrylic acid, trademark of Nippon Yushi) and 500 ppm of hydroquinone monomethyl ehter. While introducing air, the mixture was stirred at 150° C. (inner temperature) for 60 minutes. Thus obtained product had an acid value of 103 and the reaction percentage was 96%.

REFERENCE EXAMPLE 5

Preparation of end carboxyl bearing reactive monomer (5)

Into a similar reaction vessel as used in Reference Example 1, were placed 148 parts of phthalic anhydride, 400 parts of Blenmer PP-1000 (5.5:1 mol addition product of propylene oxide and methacrylic acid, trademark of Nippon Yuski), and 500 ppm of hydroquinone monomethyl ether. While introducing air, the mixture was reacted, under stirring, at 150° C. (inner temperature) for 60 minutes. Thus obtained product had an acid value of 108 and a viscosity (25° C.) of 300 cp. The reaction percentage was 95%.

EXAMPLE 1

Into a 1 liter glass flask fitted with a stirrer, a Dimroth condenser, a thermometer, dropping funnels and a nitrogen gas inlet tube, were placed 280 parts of deionized water. To this, was dropwise added a mixture of 12 parts of the end carboxyl bearing reactive monomer (1) obtained in Reference Example 1 and neutralized with dimethyl ethanolamine, 18 parts of methyl methacrylate, 18 parts of n-butyl acrylate, 16 parts of ethyleneglycol dimethacrylate and 34 parts of styrene through the dropping funnel, at 80° C. in 2 hours under stirring condition. At the same time, a solution of 1 parts of 4,4'-azobis-4-cyanovaleric acid neutralized with an alkali in 20 parts of deionized water was dropwise added to effect an emulsion polymerization.

Thus obtained product had a solid concent of 25% by weight and mean diameter of contained microparticles was 200 nm (measured by laser beam scattering method).

EXAMPLE 2

Into a similar reaction vessel as used in Example 1, were placed 280 parts of deionized water. To this, were dropwise added a mixture of 20 parts of the end carboxyl bearing reactive monomer (2) obtained in Reference Example 2 and neutralized with dimethyl ethanolamine, 16 parts of methyl methacrylate, 32 parts of n-butyl acrylate and 32 parts of styrene, and a solution of 1 part of ammonium persulfate in 20 parts of deionized water, at 80° C. in 2 hours, under stirring to effect an emulsion polymerization.

Thus obtained product had a solid content of 25% by weight and mean diameter of contained microparticles was 80 nm.

EXAMPLE 3

Into a similar reaction vessel as used in Example 1, were placed 280 parts of deionized water. To this, was dropwise added a mixture of 15 parts of the end carboxyl bearing reactive monomer (3) obtained in Reference Example 3 and neutralized with dimethyl ethanolamine, 17 parts of methyl methacrylate, 34 parts of n-butyl acrylate and 34 parts of styrene, at 80° C. in 2 hours, under stirring condition. At the same time, a solution of 1 parts of ammonium persulfate in 20 parts of deionized water was separately and dropwise added to the abovesaid mixture, to effect an emulsion polymerization.

Thus obtained product had a solid content of 25% by weight and mean diameter of contained microparticles was 150 nm.

EXAMPLE 4

Into a similar reaction vessel as used in Example 1, were placed 280 parts of deionized water. To this, were dropwise and simultaneously added a mixture of 16 parts of the end carboxyl bearing reactive monomer (4) obtained in Reference Example 4 and neutralized with dimethyl ethanolamine, 17 parts of methyl methacrylate, 34 parts of n-butyl acrylate and 33 parts of styrene and a solution of 1 parts of 4,4'-azobis-4-cyanovaleric acid neutralized with an alkali in 20 parts of deionized water, at 80° C. in 2 hours, under stirring condition, to effect an emulsion polymerization.

Thus obtained product had a solid content of 25% by weight and mean diameter of contained microparticles was 250 nm.

EXAMPLE 5

Into a similar reaction vessel as used in Example 1, were placed 280 parts of deionized water. To this, were dropwise and simultaneously added a mixture of 15 parts of end carboxyl bearing reactive monomer (5) obtained in Reference Example 5 and neutralized with dimethyl ethanolamine, 17 parts of methyl methacrylate, 34 parts of n-butyl acrylate and 34 parts of styrene, and a solution of 1 part of 4,4'-azobis-4-cyanovaleric acid neutralized with an alkali, in 20 parts of deionized water, at 80° C. in 2 hours, under stirring, to proceed an emulsion polymerization.

Thus obtained product had a solid content of 25% by weight and mean diameter of contained microparticles was 180 nm.

COMPARATIVE EXAMPLE 1

Into a similar reaction vessel as used in Example 1, were placed 270 parts of deionized water. To this, were dropwise and simultaneously added a mixture of 7.5 parts of Emal O (sodium laurate, trademark of Keo Soap), 20 parts of methyl methacrylate, 20 parts of n-butyl acrylayte and 20 parts of styrene, and a solution of 1 part of 4,4'-azobis-4-cyanovaleric acid neutralized with an alkali, in 20 parts of deionized water, at 80° C. in 2 hours, under stirring, to effect an emulsion polymerization.

Thus obtained product had a solid content of 25% by weight and mean diameter of contained microparticles was 150 nm.

EXAMPLE 6

The synthetic resin emulsions obtained in Examples 1 to 5 and Comparative Example 1 each was applied onto a glass plate by a flow coating and the coated plate was heated at 100° C. for 5 minutes to dry the coating.

Thus prepared coated plate was dipped in water (20° C.) for a defined period of time and water resistance of said plate was examined. The test results are shown in the following Table 1.

TABLE 1

| Water resistance of the respective coating | |
|---|---|
| Emulsion | test result after 10 minutes dipping |
| Example 1 | no abnormality |
| 2 | no abnormality |
| 3 | no abnormality |
| 4 | no abnormality |
| 5 | no abnormality |
| Comp. Ex. 1 | peeling, dissolution |

REFERENCE EXAMPLE 6

Preparation of basic monomer (1)

Into a 1 liter glass flask fitted with a stirrer, a Dimroth condenser and a thermometer, were placed 166 parts of dimethylaminopropyl methacrylamide (manufactured by Texaco Chem. Co.) and 72 parts of $\beta$-propiolactone and the mixture was reacted under stirring at 100° C. for 10 hours. From the chemical analysis, the product was found to be essentially of quaternary ammonium salt derived from the addition reaction of dimethylaminopropyl methacrylamide and $\beta$-propiolactone (yield 95%).

REFERENCE EXAMPLE 7

Preparation of basic monomer (2)

Into a similar reaction vessel as used in Reference Example 6, were placed 105 parts of 2-vinyl pyridine and 72 parts of $\beta$-propiolactone and the mixture was reacted, under stirring, at 100° C. for 10 hours.

From the chemical analysis, the product was found to be essentially of quaternary ammonium salt derived from the addition reaction of 2-vinyl pyridine and $\beta$-propiolactone (yield 97%).

EXAMPLE 7

Into a 1 liter glass flask fitted with a stirrer, a Dimroth condenser, dropping funnels and a nitrogen gas inlet tube, were placed 230 parts of deionized water. To this, were dropwise and simultaneously added a mixture of 4 parts of the end carboxyl bearing reactive monomer (1) (Formula I, X=H) obtained in Reference Example 1, 2 parts of dimethylamino propyl methacrylamide (manufacture by Texaco Chem.), 30 parts of methyl methacrylate, 30 parts of styrene and 40 parts of n-butyl acrylate and a solution of 1 part of 4,4'-azobis-4-cyanovaleric acid neutralized with an alkali, in 20 parts of deionized water, at 80° C. in 2 hours, under stirring, to effect an emulsion polymerization.

Thus obtained product had a solid content of 30% by weight and mean diameter of contained microparticles was 80 nm (measured by scanning electron microscope)

EXAMPLE 8

Into a similar reaction vessel as used in Example 7, were placed 240 parts of deionized water. To this, were dropwise and simultaneously added a mixture of 6 parts of the end carboxyl bearing reactive monomer (2) obtained in Reference Example 2, 2 parts of N-(3-sulfopropyl)-N-methacryloyloxyethyl-N,N-dimethyl ammonium betaine (manufacture by RASCHIG), 3 parts of methacrylamide propyl trimethyl ammonium chloride (manufactured by Texaco Chem.), 20 parts of 1,6-hexanediol dimethacrylate, 10 parts of methyl methacrylate, 30 parts of styrene and 40 parts of n-butyl acrylate, and a solution of 1 part of 4,4'-azobis-4-cyanovaleric acid, previously neutralized with an alkali, in 20 parts of deionized water, at 80° C. in 2 hours, under stirring, to effect an emulsion polymerization.

Thus obtained product had a solid content of 30% by weight and average diameter of contained microparticles was 40 nm.

EXAMPLE 9

Into a similar reaction vessel as used in Example 7, were placed 150 parts of deionized water. To this, were dropwise and simultaneously added a mixture of 8 parts of the end carboxyl bearing reactive monomer (2) obtained in Reference Example 2, 2 parts of 1-(3-sulfo propyl)-2-vinyl pyridinium betaine (manufactured by RASCHIG), 4 parts of dimethylamino neopentyl acrylate (manufactured by BASF), 30 parts of methyl methacrylate, 30 parts of styrene and 40 parts of n-butyl acrylate, and a solution of 1 part of 4,4'-azobis-4-cyanovaleric acid neutralized with an alkali in 20 parts of deionized water as in Example 8.

Thus obtained emulsion had a solid content of 40% by weight and average diameter of contained microparticles was 25 nm.

EXAMPLE 10

Into a similar reaction vessel as used in Example 7, were placed 240 parts of deionized water. To this, were dropwise and simultaneously added a mixture of 6 parts of the end carboxyl bearing reactive monomer (2) obtained in Reference Example 2, 4 parts of t-butyl aminoethyl methacrylate (manufactured by Alcolac Co.), 30 parts of methyl methacrylate, 30 parts of styrene and 40 parts of n-butyl acrylate, and a solution of 1 part of 4,4'-azobis-4-cyanovaleric acid neutralized with an alkali, in 20 parts of deionized water, as in Example 8.

Thus obtained emulsion had a solid content of 30% by weight, and average diameter of contained microparticles was 30 nm.

EXAMPLE 11

Into a similar reaction vessel as used in Example 7, were placed 230 parts of deionized water. To this, were dropwise and simultaneously added a mixture of 4 parts of the end carboxyl bearing reactive monomer (3) obtained in Reference Example 2, 2 parts of the quaternary ammonium salt (basic monomer (1)) obtained in Reference Example 6, 2 parts of dimethylaminoethyl methacrylate (manufactured by Sanyo Kasei), 30 parts of methyl methacrylate, 30 parts of styrene and 40 parts of n-butyl acrylate and a solution of 1 part of 4,4'-azobisi-4-cyano valeric acid neutralized with an alkali, in 20 parts of deionized water as in Example 8.

Thus obtained emulsion had a solid content of 30% by weight and average diameter of contained micropar-ticles was 40 nm.

EXAMPLE 12

Into a similar reaction vessel as used in Example 7, were placed 420 parts of deionized water. To this, were dropwise and simultaneously added a mixture of 6 parts of the end carboxyl bearing reactive monomer (4) obtained in Reference Example 4, 2 parts of the quaternary ammonium salt (basic mnomer (2)) obtained in Reference Example 7, 2 parts of dimethyl aminoethyl acrylate (manufactured by BASF), 30 parts of methyl metahcrylate, 30 parts of styrene and 40 parts of n-butyl acrylate, and a solution of 1 part of 4,4'-azobis-4-cyanovaleric acid neutralized with an alkali, in 20 parts of deionized water as in Example 8.

Thus obtained emulsion had a solid content of 20% by weight and average diameter of contained microparticles was 70 nm.

EXAMPLE 13

Into a similar reaction vessel as used in Example 7, were placed 230 parts of deionized water. To this, were dropwise and simultaneously added a mixture of 5 parts of the end carboxyl bearing reactive monomer (5) obtained in Reference Example 5, 2 parts of 4-vinyl pyridine, 30 parts of methyl methacrylate, 30 parts of styrene and 40 parts of n-butyl acrylate, and a solution of 1 part of 4,4'-azobis-4-cyanovaleric acid neutralized with an alkali, in 20 parts of deionized water as in Example 8.

Thus obtained emulsion had a solid content of 30% by weight and average diameter of contained microparticles was 60 nm.

COMPARATIVE EXAMPLE 2

Into a similar reaction vessel as used in Example 7, were placed 230 parts of deionized water. To this, were dropwise and simultaneously added a mixture of 4 parts of methacrylic acid, 2 parts of dimethylaminopropyl methacrylamide (manufacture by Texaco Chem. Co.), 30 parts of methyl methacrylate, 30 parts of styrene and 40 parts of n-butyl acrylate, and a solution of 1 part of 4,4'-azobis-4-cyanovaleric acid neutralized with an alkali, in 20 parts of deionized water as in Example 8.

However, in this experiment, there arised agglomerations during said addition and finally the reaction mixture turned to gel condition.

COMPARATIVE EXAMPLE 3

Into a similar reaction vessel as used in Example 7, were added 1200 parts of deionized water. To this, were dropwise and simultaneously added a mixture of 4 parts of methacrylic acid, 2 parts of t-butylaminoethyl methacrylate (manufactured by Alcolac Co.), 30 parts of methyl methacrylate, 30 parts of styrene and 40 parts of n-butyl acrylate, and a solution of 1 part of 4,4'-azobis-4-cyanovaleric acid neutralized with an alkali, in 20 parts of deionized water, as in Example 8.

Thus obtained emulsion had a solid content of 8% by weight and average diameter of contained microparticles was 400 nm.

EXAMPLE 14

To each of the emulsions obtained in Examples 7, 8 to 13 and Comparative Example 3, a small amount of ethyleneglycol monobutyl ether were added as a thickener and thus obtained composition was applied onto a glass plate by using a doctor blade. The coated plate was then heated in an oven at 60° C. for 20 minutes and the formed coating was visually examined to evaluate film-forming property of said emulsion. The test results are shown in Table 2.

TABLE 2

| Film-forming property of each emulsion | |
|---|---|
| Emulsion | visual test result |
| Example 7 | excellent transparency |
| 9 | excellent transparency |
| 10 | excellent transparency |
| 11 | excellent transparency |
| 12 | excellent transparency |
| 13 | excellent transparency |
| Comp. Ex. 3 | translucency (some blushing) |

What is claimed is:

1. An aqueous vinyl resin emulsion obtained by an emulsion polymerization of (A) 1 to 50% by weight of a salt form or free acid form of an end carboxyl bearing reactive vinyl monomer of the formula (I):

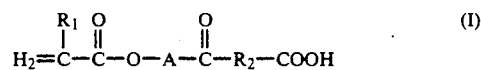

wherein $R_1$ is hydrogen or methyl group; $R_2$ is selected from the group consisting of aliphatic hydrocarbon having 2 to 10 carbon atoms, alicyclic hydrocarbon having 6 to 7 carbon atoms, chlorine-substituted alicyclic hydrocarbon having 6 to 7 carbon atoms, aromatic hydrocarbon having 6 carbon atoms, and —COOH-substituted aromatic hydrocarbon having 6 carbon atoms; A represents a repeating unit

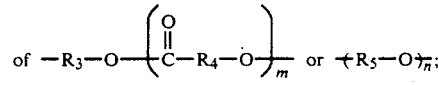

$R_3$ is ethylene or propylene; $R_4$ is alkylene having 2 to 7 carbon atoms; $R_5$ is alkylene having 2 to 5 carbon atoms; m is an integer of 1 to 10; n is an integer of 2 to 50; and (B) 99 to 50% by weight of at least one other $\alpha,\beta$-ethylenically unsaturated compounds selected from the group consisting of carboxyl containing monomers, hydroxyl containing monomers, nitrogen containing alkyl acrylates or methacrylates, polymerizable amides, polymerixable nitriles, alkyl acrylates, alkyl methacrylates, polymerizable aromatic compounds, α-olefins, diene compounds, polymerizable unsaturated monocarboxylic acid esters of polyhydric alcohols, polymerizable unsaturated alcohol esters of polycarboxylic acids, aromatic compounds having 2 or more vinyl groups; vinyl monomers of the formula:

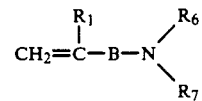

in which $R_1$ is a hydrogen or methyl group; $R_6$ and $R_7$ each represents hydrogen, having 1 to 4 carbon atoms; B is

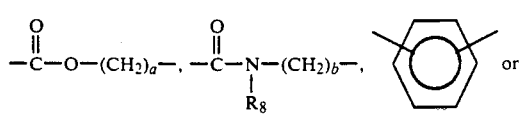

-continued

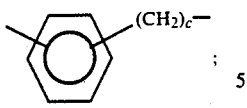

$R_8$ represents hydrogen or lower alkyl having 1 to 4 carbon atoms; a, b and c each represents an integer of 2 to 6;
vinyl monomers of the formula:

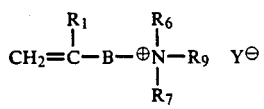

in which $R_1$, $R_6$, $R_7$ and B are as defined above; $R_9$ is alkyl having 1 to 12 carbon atoms and Y is an acid residue,
vinyl monomers of the formula:

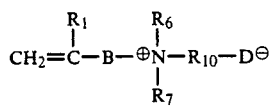

in which $R_1$, $R_6$, $R_7$ and B are as defined above, $R_{10}$ is alkylene having 2 to 6 carbon atoms, and D represents $-SO_3$, $-COO$ or $-P(O)OH$,
and vinyl monomers of the formula:

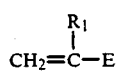

in which $R_1$ is hydrogen or methyl group, E is selected from the group consisting of:

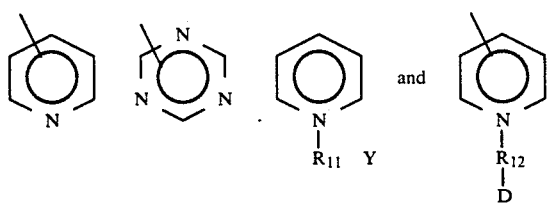

in which $R_{11}$ is alkyl, Y is an acid residue, $R_{12}$ is alkylene having 2 to 6 carbon atoms, D is $-SO_3$, $-COO$ or $-P(O)OH$,
provided that when the vinyl monomer of formula (I) is in the free acid form, then at least one of the α,β-ethyleneically unsaturated compounds (B) are selected from the vinyl monomers of the formulas:

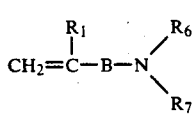

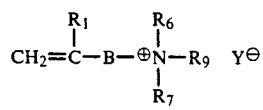

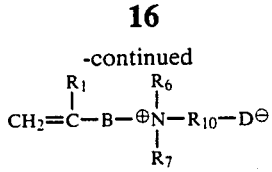

or

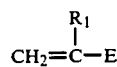

in which $R_1$, $R_6$, $R_7$, B, $R_9$, Y, $R_{10}$, D and E are as defined above.

2. An aqueous vinyl resin emulsion according to claim 1, wherein 1 to 25% by weight of the α,β-ethylenically unsaturated compounds (B) are monomers selected from the group consisting of:

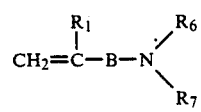

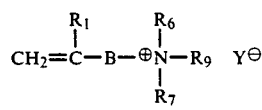

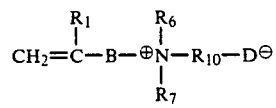

and

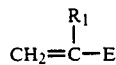

in which $R_1$, $R_6$, $R_7$, B, $R_9$, Y, $R_{10}$, D and E are as defined above.

3. An aqueous vinyl emulsion according to claim 1, wherein the emulsion polymerization is carried out with a monomer mixture of 1 to 25% by weight of the monomer represented by the formula (I) in free acid form, and 99 to 75% by weight of the α,β-ethylenically unsaturated compounds (B), 1 to 25% by weight of said compounds (B) being at least one basic monomer selected from the group consisting of:

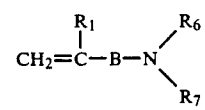

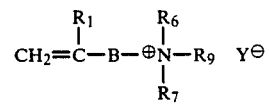

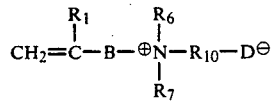

or

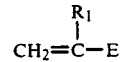

in which $R_1$, $R_6$, $R_7$, B, $R_9$, Y, $R_{10}$, D and E are as defined above.

4. An aqueous vinyl resin emulsion according to claim 3, wherein the basic monomer is a reactive vinyl monomer having an amino group or its onium structure, represented by the formula:

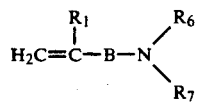 (IV)

in which $R_1$ is hydrogen or methyl group; $R_6$ and $R_7$ each represents hydrogen or a substituted or unsubstituted alkyl having 1 to 4 carbon atoms; B is

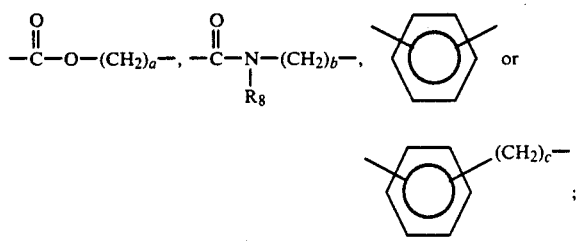

a, b and c each represents an integer of 2 to 6, or

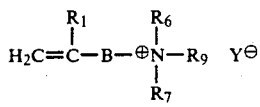 (V)

in which $R_1$, $R_6$, $R_7$ and B are as defined above; $R_9$ is a substituted or unsubstituted alkyl having 1 to 12 carbon atoms; Y is an acid residue, or

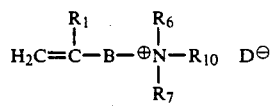 (VI)

in which $R_1$, $R_6$, $R_7$ and B are as defined above; $R_{10}$ is a substituted or unsubstituted alkylene having 2 to 6 carbon atoms; and D is $-SO_3$, $-COO$ or

5. An aqueous vinyl resin emulsion according to claim 3, wherein the basic monomer is a reactive vinyl monomer having a hetero-nitrogen atom or onium structure thereof, represented by the formula:

 (VII)

in which $R_1$ is hydrogen or methyl group; E is

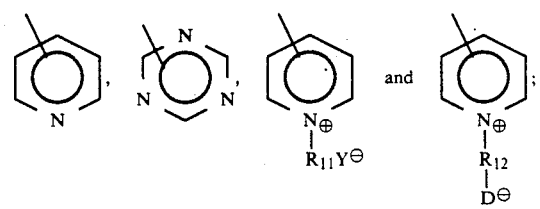

$R_{11}$ is an alkyl group; Y is an acid residue; $R_{12}$ is a substituted or unsubstituted alkylene having 2 to 6 carbon atoms; D is $-SO_3$, $-COO$ or

6. An aqueous vinyl resin emulsion according to claim 1, wherein the α,β-ethylenically unsaturated compounds (B) include a compound having 2 or more α,β-ethylenic double bonds or two different compounds each having a mutually reactive functional group.

7. An aqueous vinyl resin emulsion of claim 1 wherein $R_2$ is an aliphatic hydrocarbon having 2 to 20 carbon atoms, $R_4$ is alkylene having 2 to 7 carbon atoms, and $R_5$ is alkylene having 2 to 5 carbon atoms.

* * * * *

UNITED STATES PATENT AND TRADEMARK OFFICE
CERTIFICATE OF CORRECTION

PATENT NO. : 5,017,646
DATED : May 21, 1991
INVENTOR(S) : Muramoto et al.

It is certified that error appears in the above-identified patent and that said Letters Patent is hereby corrected as shown below:

On the title page: Item [75]
"Keizuo Ishii" should be --Keizou Ishii--.

In the Abstract, delete
"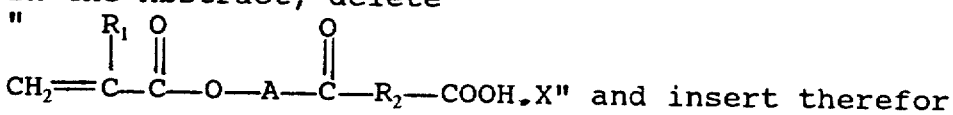 and insert therefor

-- 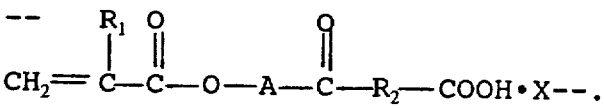 --.

In the Abstract, line 14, delete the word "relative" and insert therefor --reactive--.

Column 4, lines 1-4, delete
"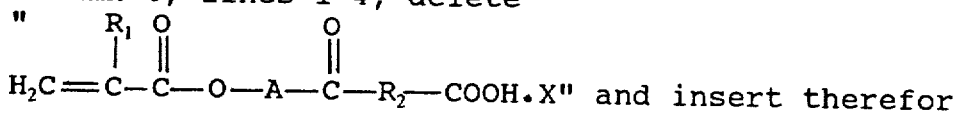 and insert therefor

-- 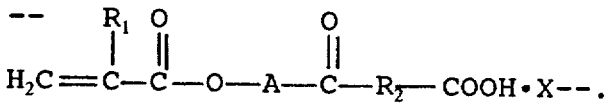 --.

Column 5, line 25, delete "151721" and insert therefor --151727/81--.

Column 9, line 11, delete the word "sued" and insert therefor --used--.

Column 9, line 28, delete the word "Yuski" and insert therefor --Yushi--.

UNITED STATES PATENT AND TRADEMARK OFFICE
CERTIFICATE OF CORRECTION

PATENT NO. : 5,017,646

DATED : May 21, 1991

INVENTOR(S) : Muramoto et al.

It is certified that error appears in the above-identified patent and that said Letters Patent is hereby corrected as shown below:

Column 10, line 55, delete the word "Keo" and insert therefor --Kao--.

Column 14, line 45, delete the word "polymerixable" and insert therefor --polymerizable--.

Column 15, line 55, delete the word "ethyleneically" and insert therefor --ethylenically--.

Column 17, line 40, insert "-" between $R_{10}$ and D.

Column 18, line 43, delete "20" and insert therefor --10--.

Signed and Sealed this

Eleventh Day of May, 1993

*Attest:*

MICHAEL K. KIRK

*Attesting Officer*   *Acting Commissioner of Patents and Trademarks*